B. DENSMORE.
GASKET PACKING FOR STEAM AND OTHER ENGINERY.

No. 84,864. Patented Dec. 15, 1868.

United States Patent Office.

BYRON DENSMORE, OF NEW YORK, N. Y.

Letters Patent No. 84,864, dated December 15, 1868.

IMPROVEMENT IN GASKET-PACKING FOR STEAM AND OTHER ENGINERY.

The Schedule referred to in these Letters Patent and making part of the same.

Be it known that I, BYRON DENSMORE, of the city of New York, in the county and State of New York, have invented a new and useful Metallic Spring-Gasket, for packing joints in steam, water, and gas-fittings, in place of rubber, hemp, or other fibrous substances; and I do hereby declare that the following is a full, clear, and accurate description of the construction of the same, reference being had to the annexed drawings, making a part of this specification, in which—

Figure 1:
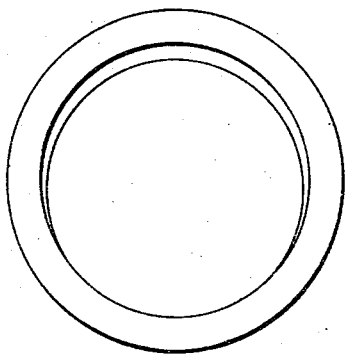

Figure 1 is a perspective view, and

Figure 2:
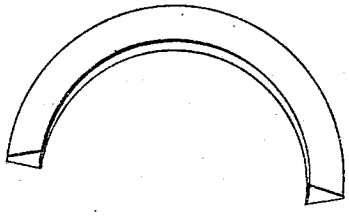

Figure 2, the perspective cut transversely in the centre, showing the form of both sides.

This gasket is made of rolled brass or copper, or of any metal that will spin into the required shape.

The metal is cut out round, say half an inch diameter larger than the gasket is to be, and a hole punched through the centre, then put on to a mandrel and pressed up firmly against a collar, of the diameter the gasket is to be, and then the part projecting out beyond the collar is spun down on to it, at right angles to the plane of the collar. It is then taken off, and both collar and gasket turned the other side to, on the mandrel, and then spun down to the required angle, which is a v-form.

To make them bevelling both sides, the side of the collar first worked against is bevelled back from the plane, corresponding to the bevel of the gasket, and the other side is bevelled in the opposite direction, so that when the gasket is changed the other side to, on the collar, the gasket fits to the collar, and has a support against it to the periphery.

In using them in making joints in pipe with unions, they are simply put to their place and the union-nut screwed on.

In making flange-joints, they are inserted, generally, inside of the bolts that bolt on the flange, but they may be used outside, or two used, one each side of the bolts.

What I claim as my invention, and desire to secure by Letters Patent, is—

Metallic spring-gaskets, made as specified.

BYRON DENSMORE.

Witnesses:
MARY E. DENSMORE,
GEORGE C. DENSMORE.